US005747885A

United States Patent [19]

Dochtermann et al.

[11] Patent Number: 5,747,885

[45] Date of Patent: May 5, 1998

[54] CENTRAL LOCKING SYSTEM FOR MOTOR VEHICLES

[75] Inventors: Ulrich Dochtermann, Lauffen; Peter Fein, Wildberg; Robert Klinar, Bietigheim-Bissingen; Werner Philipps, Ludwigsburg, all of Germany

[73] Assignee: ITT Automotive Europe GmbH, Frankfurt am Main, Germany

[21] Appl. No.: 492,341

[22] Filed: Jun. 19, 1995

Related U.S. Application Data

[63] Continuation of Ser. No. 351,326, filed as PCT/EP93/01049, Apr. 30, 1993, abandoned.

[30] Foreign Application Priority Data

Jun. 12, 1992 [DE] Germany .......................... 42 19 212.9

[51] Int. Cl.[6] .......................................................... G05D 3/00

[52] U.S. Cl. ........................... 307/10.2; 180/287; 70/264; 364/424.059

[58] Field of Search .................................... 307/9.1, 10.1, 307/10.2; 180/287, 289; 70/264; 370/85.9, 151; 364/424.05, 424.059, 424.045

[56] References Cited

U.S. PATENT DOCUMENTS

| | | | |
|---|---|---|---|
| 4,983,947 | 1/1991 | Mullen et al. | 307/10.2 |
| 5,081,586 | 1/1992 | Barthel et al. | 307/10.1 |
| 5,504,737 | 4/1996 | Ichii et al. | 307/10.1 |

FOREIGN PATENT DOCUMENTS

| | | |
|---|---|---|
| 0 246 666 | 11/1987 | European Pat. Off. . |
| 0 257 212 | 3/1988 | European Pat. Off. . |
| 0 446 574 | 9/1991 | European Pat. Off. . |
| 3 001 331 | 7/1981 | Germany . |
| 3 541 995 | 6/1987 | Germany . |
| 3 628 706 | 2/1988 | Germany . |
| 3 836 026 | 4/1990 | Germany . |
| 9 117 069 | 11/1991 | WIPO . |

OTHER PUBLICATIONS

Substitute specification marked "ITT-710/Klein 135" which corresponds to WO 9 117 069 and is provided as an English translation for this reference.

European Search Report dated Aug. 25, 1993.

*Primary Examiner*—Richard T. Elms
*Attorney, Agent, or Firm*—Thomas N. Twomey; J. Gordon Lewis

[57] ABSTRACT

A central locking system for a motor vehicle which has a number of actuators, each of which has a signal transmitter unit which sends data signals to a control unit as a function of current condition parameters of a monitored opening of the motor vehicle or as a function of externally input command signals, and the control unit generates control signals from these data signals, and final control elements of the central locking system, which bring about the locking and unlocking of the opening of the motor vehicle, are triggered by these control signals. According to the present invention, each actuator of the central locking system has a separate control unit to which the data signals of the signal transmitter unit of its actuator, as well as selected data signals of the signal transmitter units of the other actuators of the central locking system are sent.

28 Claims, 3 Drawing Sheets

CENTRAL LOCKING SYSTEM FOR MOTOR VEHICLES

This application is a continuation of U.S. application Ser. No. 08/351,326, filed on 12 Dec. 1994, now abandoned, which is the U.S. national-phase application of PCT International Application No. PCT/EP93/01049 filed on 30 Apr. 1993.

TECHNICAL FIELD

The present invention relates to a central locking system for motor vehicles, with a number of actuators, each of which has a signal transmitter unit, which transmits data signals to a control unit, as a function of current condition parameters of an opening monitored by it and/or of an operating element of the motor vehicle, or as a function of externally input command signals, and the control unit generates control signals from these data signals, and final control elements of the central locking system, which bring about the locking and unlocking of the openings of the motor vehicles, are triggered with these control signals.

BACKGROUND OF THE INVENTION

Such a central locking system is known from German Offenlegungsschrift No. DE-OS 36 28 706. Each actuator of the central locking system is connected via a bus system to a central processor, which evaluates the condition parameters of the doors of the motor vehicle, which are recorded by the signal transmitter units of the individual actuators. The data signals supplied by the signal transmitters are then converted into control signals for the final control elements of the central locking system according to a program stored in the central processor. The control signals are, in turn, sent to the final control elements via the bus system. The drawback of the prior-art central locking system is the extremely complicated flow of signals. The signals must first be sent from each actuator to the central processor, and the control signals which are calculated must, in turn, be sent to the final control elements of the central locking system. This bidirectional flow of signals between actuators or final control elements and the central processor requires, in a disadvantageous manner, a complex bus management.

A central locking system for a plurality of active functional units and/or passive components of a motor vehicle is known from German Offenlegungsschrift No. DE-OS 38 36 026. This system has a signal input means responding to an externally input command signal, which controls the locking and unlocking of the functional units coupled with it, or the passive components. The signal input means has a data processing unit, which converts the input signals supplied by an external signal transmitter of the signal input means into control signals for the functional unit, which are sent to the functional units of the central locking system via a serial interface and a bus line. Consequently, command signals can be recorded and control commands, which will then lead to locking or unlocking of the final control elements of the functional units, can be sent only at a single point of the central locking system in this central locking system in a disadvantageous manner.

SUMMARY OF THE INVENTION

To avoid these drawbacks, an objective of the present invention is to improve a central locking system of the class described above such that a simplification of the flow of signals necessary for the operation of the central locking system will be achieved.

This is achieved by each actuator of the central locking system having a separate control unit, to which the data signals of the signal transmitter unit of its actuator, as well as selected data signals of the signal transmitter units of the other actuators of the central locking system, are sent.

A drastic reduction in the signal information to be transmitted is achieved in a particularly advantageous manner due to the decentralized control used in the central locking system according to the present invention. While each data signal of each signal transmitter unit of each actuator of the central locking system must be sent to the central processor, and the control signals calculated from them must, in turn, be transferred back to the final control elements in prior-art systems, the central locking system according to the present invention makes it possible to perform the same functions with a considerably reduced number of transmitted data, because only the data signals generated in an actuator which are relevant for the overall function of the central locking system must be transmitted to the other actuators in a particularly advantageous manner according to the present invention. The transmission of control signals outside an actuator is advantageously completely eliminated. In addition, the decentralized control makes it possible, in an especially simple manner, to provide comfort functions of the central locking system for each door individually.

Further details of the present invention are described in greater detail below in connection with the drawings.

DETAILED DESCRIPTION OF THE INVENTION

Figure 1:
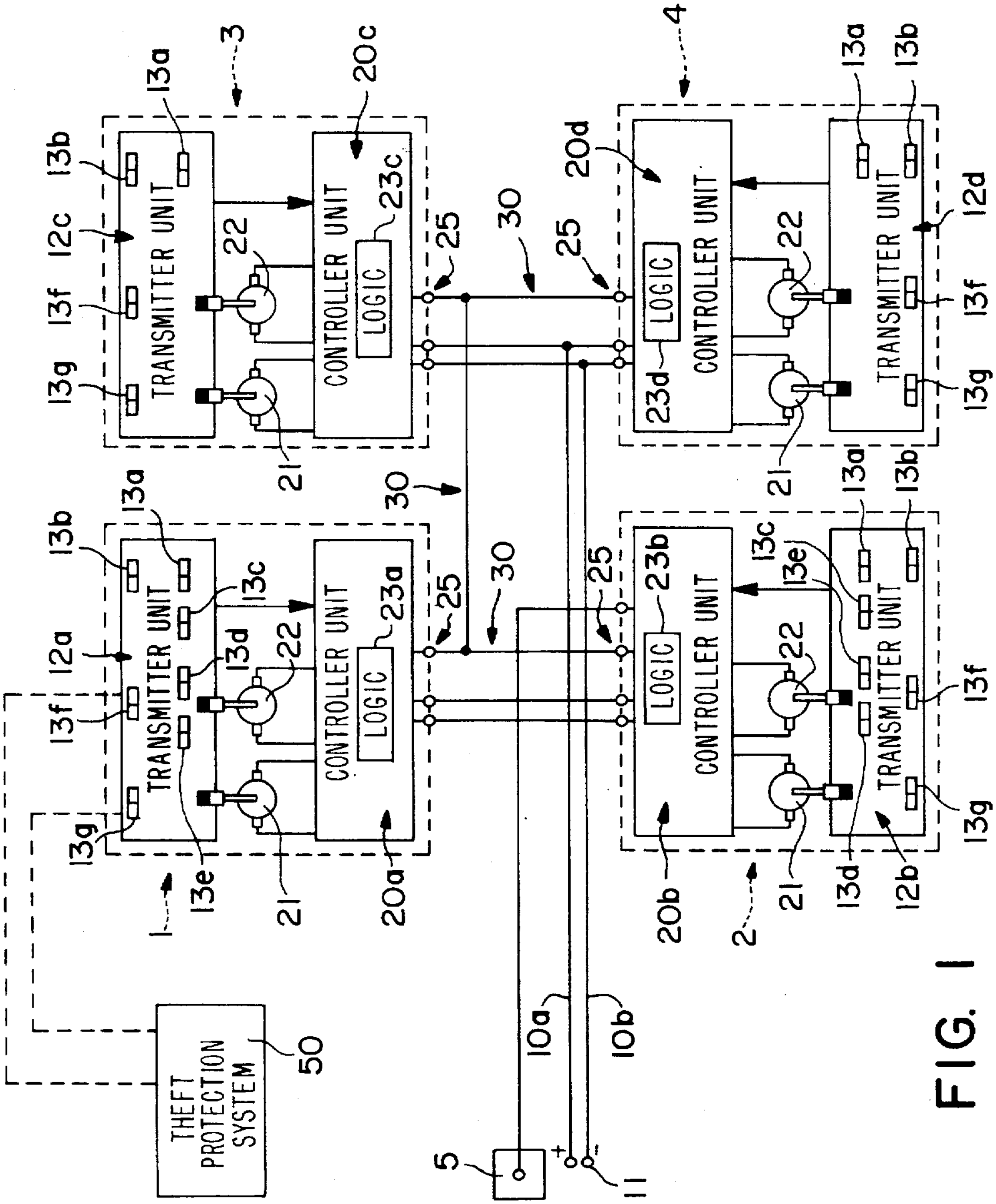
FIG. 1 shows a functional diagram of a first embodiment of the present invention.

The first embodiment of a central locking system for a motor vehicle, constructed in accordance with the present invention and which is schematically shown in FIG. 1, has four actuators 1–4. Without limiting the general nature of the following explanations, it is assumed that the actuators 1 and 2 are used for locking and protection against theft of a right and a left front door, respectively, and that the actuators 3 and 4 are used for the same purpose for the rear doors of a four door motor vehicle. Each actuator 1–4 is connected to a power supply unit 11 of the motor vehicle via a pair of supply lines **10*a*, 10*b***. The number of four actuators shown in FIG. 1 was selected only as an example. The person skilled in the art will easily understand from the following explanations how the arrangement described can be adapted to a central locking system containing more than four actuators.

Each actuator 1–4 has a signal transmitter unit **12*a*–12*d* consisting of at least one signal transmitter. A first signal transmitter 13*a* of the signal transmitter unit sends a data signal, which indicates whether the door to be monitored is opened or prelocked or closed. A second signal transmitter 13*b* indicates that the door is completely closed. The third through fifth signal transmitters 13*c*–13*e* are used for controlling the central locking system by the user of the motor vehicle. The third signal transmitter 13*c* records, via an external command signal, e.g., a defined position of the automobile key in the door lock, that the user would like to activate a theft protection system 50 (connection to only one of the actuators is shown for purposes of simplicity) cooperating with the central locking system. The fourth and fifth signal transmitters 13***d* and 13*e* analogously record that the user would like to unlock or lock the motor vehicle, i.e., that the final control elements of the central locking system should be locked or unlocked. Since the rear doors of motor vehicles usually are not equipped with locks, the actuators 3, 4 associated with these doors have no third through fifth signal transmitters 13*c*–13*e*, as can be seen from FIG. 1. The sixth and seventh signal transmitters 13*f*–13*g* are used to monitor the position or the function of the final control elements of the theft protection system 50 and of the central locking system or of functional components.

A number of possibilities of how these signal transmitters are to be designed to assume the functions assigned to them are known to the person skilled in the art. However, it is particularly advantageous for the signal transmitters 13*a*–13*g* to be designed as Hall sensors, because the data signals sent by Hall sensors can be processed without additional conversion. In addition, the use of Hall sensors operating in a contactless manner offers the advantage that the signal transmitters have a longer life, because they are not subject to any mechanical wear.

It is particularly important now for each actuator 1–4 of the central locking system to have a separate control unit 20*a*–20*d*, to which the data signals generated by the signal transmitters 13*a*–13*g* are sent.

Each control unit 20*a*–20*d* of an actuator 1–4 polls the signal information of the individual signal transmitters 13*a*–13*g* of the signal transmitter unit 12*a*14 12*d*, and on the basis of these data signals as well as of selected data signals of the other actuators, it calculates control signals for motor drives 21 and 22, which generate adjusting commands for those final control elements of the central locking system and of the theft protection system 50 which are associated with the corresponding actuator. It should be mentioned that the motor drives 21 and 22 are represented only schematically in FIG. 1 among the functional units of the central locking system with the theft protection system 50 being described, because the designs of the other functional units of a central locking system and of a theft protection system are known to the person skilled in the art.

To transmit the selected data signals, i.e., the signals which are relevant for all actuators 1–4 of the central locking system, a bus system 30 is provided, by which the messages sent from the actuators 1–4 are transmitted by time-division multiplex. This bus system 30 is advantageously designed as a multi-master bus system, so that each actuator 1–4 can request the bus system 30 via an interface logic 23*a*–23*d* integrated in the control unit 20*a*–20*d*. The bus system 30 may be managed according to a prior-art bus arbitration process.

Figure 3:
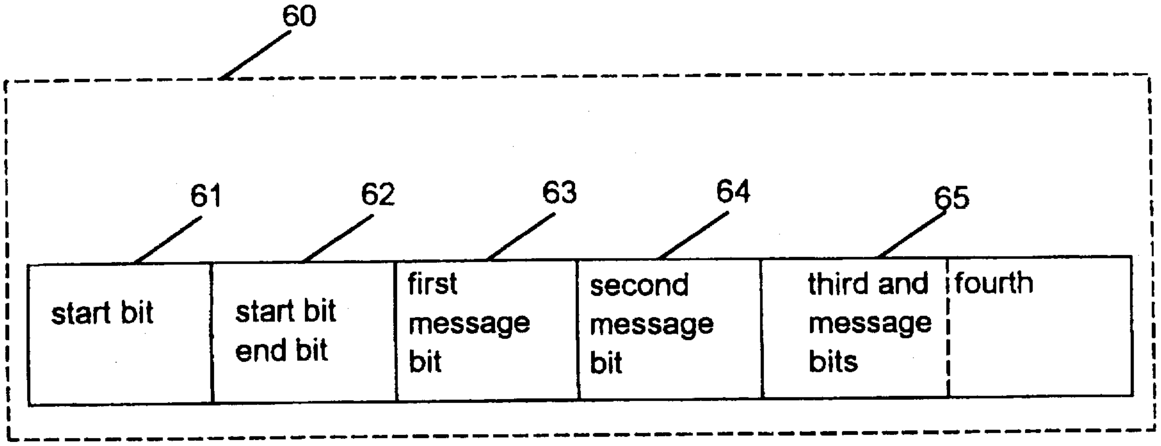
FIG. 3 shows an exemplary bit block in accordance with the present invention. Start bit end bit 62 is an optional bit that is not always present in the bit block 60.

To exchange the relevant signal information among the four actuators 1–4 of the central locking system via the bus system 30, each message of one actuator consists of a bit block 60, which has a standardized structure. An exemplary bit block 60 in accordance with the present invention is shown in FIG. 3. The first bit of the bit block 60 is a start bit 61, which indicates the start of the transmission of the bit block 60. It is important in this connection for the value of the start bit 61 to correspond to the value of the dominant level on the bus system 30, so that each actuator 1–4 of the central locking system will correspond to the value of the dominant level on the bus system 30 by sending a start bit 61, so that each actuator 1–4 of the central locking system can attract the bus system 30 to it by sending the start bit 61. Without limiting the general nature, it will hereinafter be assumed that the actuators 1–4 are connected to the bus system 30 via their interface logic by means of open collector outputs 25, so that the dominant level of the bus system 30 has the value “0” as a consequence of the “wired-AND” connection formed as a result. The start bit 61 is now followed by a plurality of message bits. A first message bit 63 indicates the position of the door associated with the corresponding actuator. The value “1” of the first message bit 63 means that this door is completely closed. The first message bit 63 is followed by a second message bit 64, which is used for switching on an interior light 5 of the motor vehicle. The value “1” or “0” of the second message bit 64 indicates that this door is closed/prelocked or opened, respectively. The second message bit 64 is followed by a bit group 65 consisting of the third and fourth message bits, which contain, in a coded form, the external command signals recorded by the third through fifth signal transmitters 13*c*–13*e* of an actuator (e.g., of actuator 1). If the two message bits of this bit group 65 simultaneously have the value “0,” the remaining actuators 2–4 of the central locking system are informed that the user of the motor vehicle would like to unlock the central locking system and switch off the theft protection system 50. The value pair “0, 1” or “1, 0” of this bit group 65 means that the vehicle shall be locked or the theft protection system 50 shall be armed. If the third and fourth message bits 65 both have the value “1,” this means that no action is to be performed. The sequence and number of message bits described here and the meanings assigned to them represent only one of many possible variants. Thus, it is also possible for parity bits or control bits to be contained in at least one condition message (i.e., bit block 60). Based on the above description, the person skilled in the art can easily determine how [he has] to proceed if more pieces of information or other pieces of information are to be transmitted from one actuator to the other actuators of the central locking system via the bus system 30, because this can be done particularly easily by increasing the message bits, which is simple to perform.

The decentralized control of the central locking system being described offers the advantage over the prior-art systems with central control that it makes it possible to drastically reduce the signal information to be transmitted. All pieces of information of each signal transmitter of each actuator must be transferred to the central electronic unit in prior-art central locking systems, and the control signals calculated from them by the central electronic unit must be sent back to the final control elements of the central locking system and of the theft protection system 50, which are arranged at the doors of the motor vehicle and cooperate with the corresponding actuator. However, in a central locking system with decentralized control, only the pieces of information of the signal transmitters 13*a*–13*g* must be sent from one actuator to the other actuators 1–4 which can influence the function of these actuators. For example, the transmission of control signals for the movement of the final control elements of each actuator is irrelevant for the other actuators, because each actuator 1–4 independently identifies the control signals for the final control elements associated with it. Such a signal transmission among the individual actuators may therefore be completely eliminated in a particularly advantageous manner. The flow of signals necessary for the function of the central locking system is therefore drastically reduced. In addition, it is possible due to the decentralized control of the central locking system to integrate the so-called comfort functions of a central locking system, (e.g., an individual locking and unlocking of a certain door of the motor vehicle), in a particularly simple manner.

All the signal information necessary for the central locking and theft protection functions as well as for triggering the interior light are available for all other actuators with a single message of one actuator of the actuators 1–4 in a particularly advantageous manner, because the pieces of information indicating that a) one door only is prelocked or opened and the interior light must therefore be switched off, b) at least one door is not completely closed and the theft protection system 50 therefore must not be activated, and c) the external commands of the user of the motor vehicle to lock or unlock the central locking system and to switch the theft protection system 50 on or off are sent with the dominant level "0" to the bus system 30 at each message.

The decentralized control used in the central locking system described requires the control units 20*a*14 20*d* of each actuator 1–4 to generate the system cycle necessary for their data processing themselves, because no central processor is provided. The signals on the bus system 30 are then scanned with the system cycle peculiar to the corresponding control unit 20*a*–20*d*. Correct data transmission via the bus system 30 therefore requires that a correlation be present between the system cycles of the individual actuators 1–4. This can be achieved, on the one hand, in the known manner by each actuator 1–4 having a highly accurate crystal, so that the periods of the individual system cycles will agree with sufficient accuracy. The individual actuator cycles may also be synchronized by one actuator being designed as a cycle master. The distribution is then performed on the bus in the message format. It is also particularly advantageous to proceed as follows.

An additional start bit end bit 62, which has a value complementary to the value of the start bit 61, is inserted between the start bit 61 and the first message bit 63 of each bit block 60 of a message. Due to this defined bit structure (here: the start bit 61 with the value of "0" and the start bit end bit 62 with the value of "1") at the beginning of each message block, the receiving actuators of the central locking system are able to recognize the system cycle of the actuator sending this message block. While the start bit 61 is being transmitted on the bus system 30, a reference counter, which counts the number of the separate system cycles which take place during the start bit 61, also runs in the control unit 20*a*–20*d* of each of the receiving actuators. The receiving actuator thus knows the length of one bit of the sending actuator in units of its own system cycle, and it is therefore able to correspondingly resolve in time the arriving signal data. This particularly simple solution to the synchronism problem, which occurs in a central locking system with decentralized control, makes it possible to use a less accurate and therefore more inexpensive oscillator, (e.g., an RC oscillator), to generate the system cycle, as a result of which the manufacturing costs of the control unit of each actuator are reduced. In addition, it is advantageous that such a correlation setting has a high error tolerance for deviations of the different system cycles of the actuators, which can now be in a range of 30–200%.

As is also apparent from FIG. 1, provisions can be made for the triggering of functional components of the motor vehicle, whose activation depends on the closed position of one of the doors, and which assume a function independent from the actual central locking system and/or from the theft protection system 50, (e.g., the interior light 5), to be assumed by a single actuator 2 of the central locking system. This can be achieved particularly easily in the exemplary embodiment described, because each actuator 1–4 of the central locking system has all the relevant information generated in the other actuators available to it. This measure brings about a simplification of the design expenditure for the control unit of the other actuators 1, 3, 4.

Figure 2:
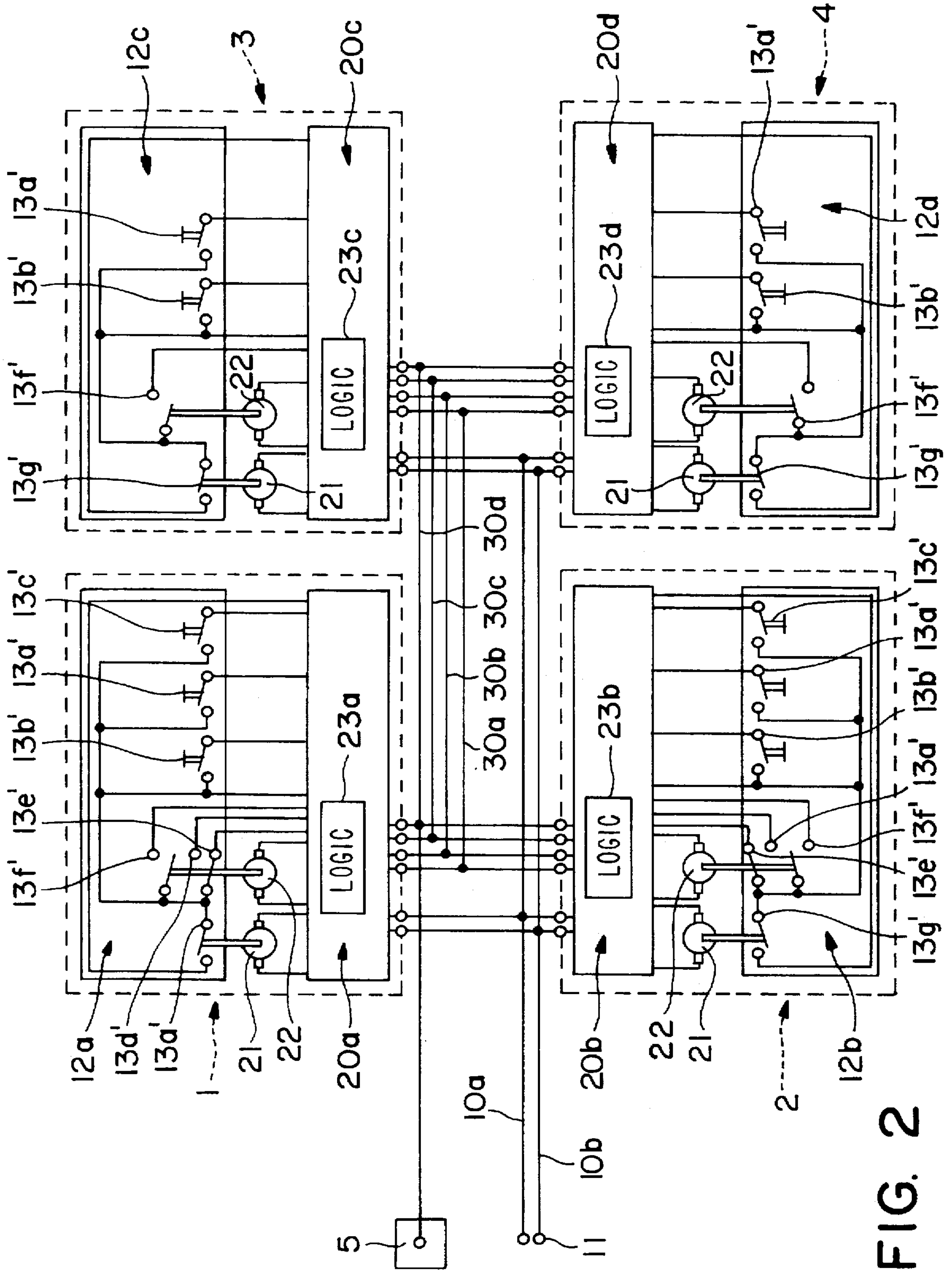
FIG. 2 shows a functional diagram of a second embodiment of the present invention.

The exemplary embodiment shown in FIG. 2 corresponds essentially to that shown in FIG. 1, so that identical parts are designated by the same reference numerals. The essential difference between these two exemplary embodiments is the fact that in FIG. 2, on the one hand, four parallel lines 30*a*–30*d*, on which the condition of each bit is statically or dynamically transmitted in parallel among the actuators, are used for data transmission instead of the bus system 30. The number of necessary lines is determined by the number of bits of a condition message to be transmitted. This offers the advantage that the multiplex format signals necessary in the time-division multiplex process can be eliminated in the case of such a signal transmission, as a result of which a further simplification of the control electronic unit becomes possible.

On the other hand, as is apparent from the circuit symbols used in FIG. 2, conventional switches 13*a*–13*g* are used instead of the Hall sensors. However, it is also possible to use Hall sensors as well in the FIG. 2 embodiment.

The mode of operation of the second exemplary embodiment is readily understandable to the person skilled in the art from FIG. 2 on the basis of the description of the first exemplary embodiment.

We claim:

1. Central locking system for motor vehicles, with a plurality of actuators, each of which has a signal transmitter unit, which sends data signals to a control unit as a function of current condition parameters of at least one of a monitored opening and an operating element of a motor element, or as a function of externally input command signals, the control unit generates control signals from said data signals which bring about the locking and unlocking of the openings of the motor vehicle, characterized in that each and every actuator of the central locking system has a separate control unit, to which the data signals of the signal transmitter unit of its actuator as well as selected data signals of the signal transmitter units of the other actuators of the central locking system are sent.

2. Central locking system in accordance with claim 1, characterized in that a data transmission among the actuators of the central locking system is performed in time-division multiplex via a bus system designed as a multi-master system.

3. Central locking system in accordance with claim 1, characterized in that a data transmission among said actuators of the central locking system takes place via parallel lines, and the number of lines corresponds to the number of bits of a condition message of the central locking system to be transmitted.

4. Central locking system in accordance with claim 3, characterized in that said actuators of the central locking system have an interface logic each, which establishes a connection between said control unit of each said actuator and a bus system.

5. Central locking system in accordance with claim 4, characterized in that the interface logic of each said actuator is connected to said bus system via an output, and said output generates a dominant level on the bus system.

6. Central locking system in accordance with claim 5, characterized in that each condition message transmitted from said control unit of said actuator via the interface logic to said bus system has a standardized structure, such that each condition message is transmitted to said bus system in the form of a bit block of defined length, and that each bit block consists of a start bit and one or more message bits following said start bit.

7. Central locking system in accordance with claim 6, characterized in that each bit block has a start bit end bit, which is transmitted after the start bit and before the first message bit, and the start bit and the start bit end bit have complementary values.

8. Central locking system in accordance with claim 7, characterized in that the message bits represent parity bits or control bits or data signals, which are generated by signal transmitters of said signal transmitter units.

9. Central locking system in accordance with claim 8, characterized in that at least one said signal transmitter of one said signal transmitter unit of at least one said actuator of the central locking system responds to an external command signal, which is sent by the user of the motor vehicle to activate or deactivate a theft protection system cooperating with the central locking system.

10. Central locking system in accordance with claim 8, characterized in that at least one said signal transmitter of at least one said actuator of the central locking system responds to an external command signal, which is sent by the user of the motor vehicle to activate or deactivate a central locking system.

11. Central locking system in accordance with claim 10, characterized in that the signal transmitters of said signal transmitter units are designed as at least one of Hall sensors and conventional switches.

12. Central locking system in accordance with claim 11, characterized in that only one said actuator of the actuators of the central locking system is used to trigger functional components of the vehicle, whose activation depends on the condition parameters of the openings to be monitored, and which assume a function independent from at least one of the actual central locking system and theft protection system.

13. Central locking system in accordance with claim 12, characterized in that each said actuator of the central locking system contains at least one drive, which generates adjusting signals for at least one of the central locking system and the theft protection system.

14. Central locking system in accordance with claim 5, characterized in that the output is an open collector output.

15. A central locking system for a motor vehicle comprising a plurality of actuators, each and every actuator having:

a signal transmitter unit which sends data signals representative of at least one of:

(a) current condition parameters of a monitored opening of the motor vehicle, (b) current condition parameters of an operating element of a motor element, and (c) external input command signals; and a control unit:

(a) to which:

(1) said data signals from said signal transmitter unit of said actuator, and (2) selected data signals of the signal transmitter units of the other actuators are sent, and (b) which generates control signals from said data signals for locking and unlocking of the openings of the motor vehicle.

16. A central locking system according to claim 15 further including a multi-master bus system for time-division multiplex data transmission between said actuators.

17. A central locking system according to claim 16 wherein said bus system includes a plurality of parallel lines, the number of said parallel lines corresponding to the number of bits of a condition message to be transmitted.

18. A central locking system according to claim 17 wherein each of said actuators includes an interface logic through which said control unit is connected to said bus system.

19. A central locking system according to claim 18 wherein said interface logic is connected to said bus system by an open collector output which generates a dominant level on said bus system.

20. A central locking system according to claim 19 wherein each condition message transmitted from said control unit by said interface logic to said bus system has a standardized structure in the form of a bit block of defined length, with each bit block having a start bit and at least one message bit following said start bit.

21. A central locking system according to claim 20 wherein each said bit block has a start bit end bit after said start bit and before the first message bit, and said start bit and said start bit end bit have complementary values.

22. A central locking system according to claim 21 wherein said signal transmitter unit includes a plurality of signal transmitters which generate said message bits and said message bits represent at least one of parity bits, control bits and data signals.

23. A central locking system according to claim 22 wherein at least one of said signal transmitters of one of said signal transmitter units of at least one of said actuators responds to an external command signal which is sent by the user of the motor vehicle to activate or deactivate a theft protection system cooperating with the central locking system.

24. A central locking system according to claim 22 wherein at least one of said signal transmitters of one of said signal transmitter units of at least one of said actuators responds to an external command signal which is sent by the user of the motor vehicle to activate or deactivate the central locking system.

25. A central locking system according to claim 15 wherein said signal transmitter is a Hall sensor.

26. A central locking system according to claim 15 wherein said signal transmitter is a switch.

27. A central locking system according to claim 15 wherein only one of said actuators triggers functional components of the motor vehicle whose activation depends on the condition parameters of the monitored and which assume a function independent from the central locking system and a theft protection system.

28. A central locking system according to claim 15 wherein each of said actuators includes at least one drive which generates adjusting signals for the final control elements of the central locking system and a theft protection system.

* * * * *